United States Patent [19]
Fazekas et al.

[11] 3,840,239
[45] Oct. 8, 1974

[54] COMPRESSION MOLDING IN A VACUUM AND SEAL FOR USE THEREIN

[75] Inventors: Thomas W. Fazekas, Stow; Walter A. Hartz, Cuyahoga Falls; Norman J. Muth, Mogadore; Raymond J. Stadelman, Akron, all of Ohio

[73] Assignee: The General Tire & Rubber Company, Akron, Ohio

[22] Filed: Oct. 26, 1972

[21] Appl. No.: 300,944

[52] U.S. Cl. .......................................... 277/235 R
[51] Int. Cl. .............................................. F16j 15/32
[58] Field of Search ......... 425/388; 164/61; 118/50; 141/51; 277/235

[56] References Cited
UNITED STATES PATENTS

| | | | |
|---|---|---|---|
| 2,642,216 | 6/1953 | Carter | 141/51 |
| 2,799,066 | 7/1957 | Federman et al. | 164/DIG. 9 |
| 3,346,267 | 10/1967 | Farley | 277/235 |

*Primary Examiner*—William D. Martin, Jr.
*Assistant Examiner*—Robert I. Smith

[57] ABSTRACT

It has been discovered that by compression molding plastics with the entire mold chamber evacuated well below atmospheric pressure, it is possible to minimize the number of surface defects of the type known as porosity. This discovery is based upon the finding that porosity is caused by air which is trapped between the molding compound and the surface of the mold cavity, and also by air which is trapped between converging flow fronts of adjacent charges of molding compound. To enable the evacuation of the mold chamber, a vacuum seal is provided which comprises a belt-like wall member having reinforcing members embedded vertically within the wall. As the mold halves converge, the bottom edge of the seal engages the outer surface of the base member thereby sealing the chamber from the atmosphere, and the chamber is then evacuated before pressure is applied to the molding compound.

8 Claims, 6 Drawing Figures

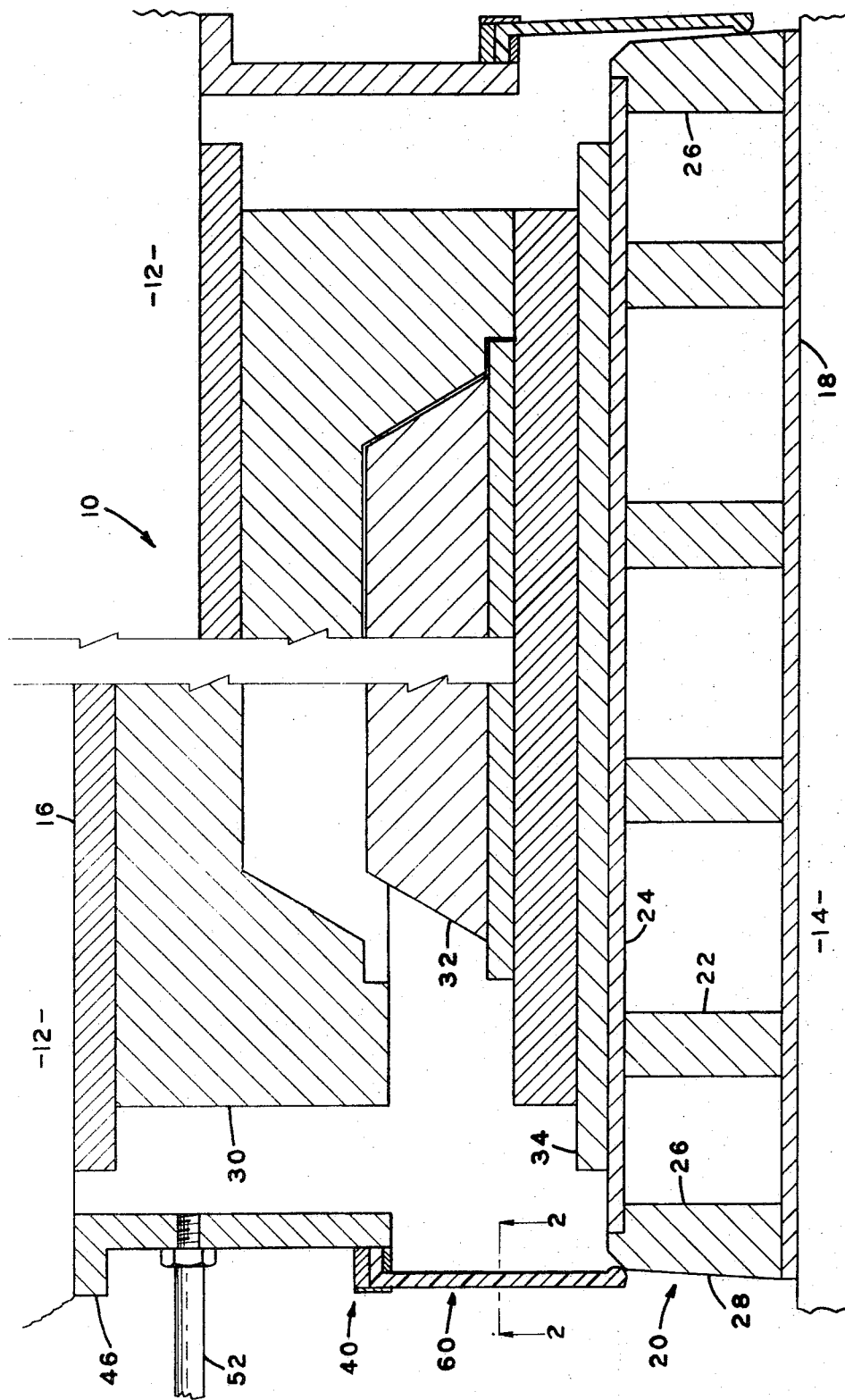

COMPRESSION MOLDING IN A VACUUM AND SEAL FOR USE THEREIN

BACKGROUND OF THE INVENTION

This invention relates to compression molding and particularly to a method and apparatus for compression molding in a vacuum to minimize surface defects such as porosity.

The compression molding of plastic materials, especially thermoset compounds such as FRP (fiberglass reinforced plastic) has become increasingly popular. The use of compression molded FRP parts is especially advantgeous where a good surface finish is required such as for various exterior automotive parts.

The major problem which has been encountered in the use of FRP, where a good surface is required, has been the large number of surface defects referred to as "pinhole" defects, or porosity. Presently, compression molded plastic parts are inspected 100 percent for porosity, and when such defects are found, the part must either be scrapped or repaired. If the part can be repaired, it must then be inspected again and possibly repaired and re-inspected one or more additional times. In repairing parts which will subsequently be painted, after the manual reworking there is often a coat of primer paint applied to cover some of the small pits. These time-consuming and expensive repair and re-inspection steps add substantially to the cost of compression molding plastic, and if most of the added expense could be eliminated not only would the product be much less costly, but also, compression molded plastic would be better able to compete with other materials in many new markets such as exterior automotive parts.

Various methods have been tried in the prior art to eliminate, or at least reduce the surface defects in FRP molded parts. Among the specific ways tried by the prior art to reduce such surface defects are the following:
a. Experiment with different ranges of plasticity.
b. Increase the molding pressure.
c. Lower the temperature of the mold. d. Close the mold faster and apply high pressure sooner.
e. Preheat the charges of molding compound.
f. Experiment with differing charge weights.
g. Try a higher density molding compound to obtain greater "back pressure" in the mold.
h. Breathe the mold earlier.
i. Use the semi-positive molds.

Presently, since none of the above has provided any real sucess in the attempt to eliminate porosity, it has become production method when starting to mold a different part to place the material charges in the mold cavity in a configuration which is found, by trial and error, to yield the least porosity. This experimentation is not only time consuming, but also has been unable to reduce the defects to anywhere near an acceptable level.

In injection molding, it has become common practice to scribe lines in the mold cavity in the hope that any air trapped between the cavity and the injection molding material will be able to escape by means of the grooves scribed into the surface. It is apparent, however, that this practice offers no solution in the compression molding of parts which require a smooth surface finish, since the grooves in the mold cavity normally result in ridges on the finished part.

The prior art attempted to use vacuum in injection molding to reduce the number of non-fills which occurred. The non-fills in injection molded parts differ from compression molded surface defects such as porosity in that non-fills are substantially larger. A vacuum has been applied to the injection molding cavity to eliminate these non-fills which occur primarily as a result of air that is trapped in the cavity by the incoming material, under high pressure and moving at a high velocity.

The application of a vacuum to the cavity of a compression mold was not considered as a possible solution to the porosity problem by the prior art because of the difference in the nature of the defects involved, the greater pressure and speed with which the material is injected into the mold compared to the lower pressure and extremely slow speed of charge flow in compression molding and also because, in compression molding, the material is not within a totally enclosed mold as in the case of injection molding.

Accordingly, it is a primary object of the present invention to provide a method of compression molding which will eliminate or substantially reduce surface defects.

It is another object of the present invention to provide a method and apparatus for compression molding plastic which will make possible a reduction in the amount of costly inspection required for the molded parts.

It is also an object of the present invention to provide an apparatus which will facillitate the evacuation of the cavity formed between the two converging mold halves.

It is a further and more detailed object of the present invention to provide a seal which will make it possible to seal the mold chamber from the surrounding atmosphere as the top and bottom halves come together, so that the mold cavity is evacuated during the entire time that the molding compound is subject to pressure.

SUMMARY OF THE INVENTION

These and other objects of the present invention, which will become evident upon reading the following detailed description, are accomplished by the provision of an elastomeric vacuum seal fixedly and sealingly attached to the press portion of the compression molding press. The seal has a belt-like elastomeric wall member oriented generally vertically and a plurality of elongated reinforcing members fixedly mounted in contact with the wall member and oriented vertically. Also provided is a base portion for the molding press which has its outer surface slightly inclined inwardly toward the top. In operation, the base portion is raised relative to the press portion causing the vacuum seal to come into sealing and sliding engagement with the outer surface of the base portion, thereby sealing off the mold cavity from the surrounding atmosphere. Once the cavity is sealed, a vacuum of at least 20 inches of mercury is applied to the mold cavity and is maintained during the entire time that the mold is closing and the compound is flowing, thereby reducing the entrapment of air between the molding compound and the mold cavity. Once the material flow is completed, the vacuum can be terminated. This evacuation serves the additional purpose of eliminating air trapped between the converging flow fronts of different charges. As a result, the knit lines (where the different charges of molding compound meet and fuse), are stronger because there are fewer voids.

These and other objects and advantages will be apparent to one skilled in the art from a reading of the following detailed description and upon reference to the drawings, in which:

BRIEF DESCRIPTION OF THE DRAWINGS

FIG. 1 is a two-position cross section of a molding press utilizing the present invention;

DESCRIPTION OF THE PREFERRED EMBODIMENT

Figure 4:
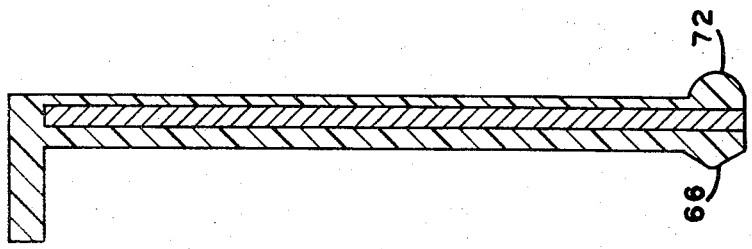
FIG. 4 is a view similar to FIG. 3 illustrating an alternative embodiment of the vacuum seal of the present invention.

Referring now more specifically to the drawings, which are for the purpose only of illustrating preferred embodiments of the present invention, and not for limiting the same, FIG. 1 illustrates the operation of the method and vacuum seal of the present invention. Compression molding press 10 is shown with the left half at about the midway point of its stroke and the right half at the completion of the stroke, the position which is then maintained while the molded part cures.

THE MOLDING PRESS

The molding press 10 includes an upper bolster plate 12 and a bottom bolster plate 14, with a top base plate 16 bolted to the upper bolster plate 12, and a bottom base plate 18 bolted to the bottom bolster plate 14. The seal base 20, welded to the bottom base plate 18, includes four internal legs (or support bars) 22, which extend most of the width of the seal base 20 and provide a base for the support plate 24. Around the perimeter of the seal base 20, which in the subject embodiment is rectangular with rounded corners, is the base outer member 26 which has an inclined outer surface 28. The angle of incline of the surface 28 may vary from a couple of degrees to ten or more degrees, depending on the elastic characteristics of the vacuum seal, which will be more fully described hereinafter.

The actual mold portion of the press includes a mold upper half 30, fastened to the top base plate 16 by means of a series of integral ears (not shown), held firmly to the top base plate by a metal attachment strap (also not shown) through which bolts pass and extend through the top base plate and are threaded into the upper bolster plate. A similar arrangement is employed to attach the mold lower half 32. This means of attachment of the mold halves is well known to those skilled in the press art, and therefore is not illustrated or described in further detail. Held in place between the mold lower half 32 and the support plate 24 is an insulation plate 34, which provides thermal insulation between the hot mold and the vacuum seal 60. The insulation plate 34 can be made from any non-metallic material which can withstand elevated temperatures such as 300°–300°F. continually, without breaking down, decomposing, or losing its thermal insulating capability. It is also possible to insulate the vacuum seal 60 by making support plate 24 from an insulating material and eliminating the separate insulating plate 34, since the only purpose to be served is preventing excessive heat transfer from the mold lower half 32 through base outer member 26 to outer surface 28, from where the heat can damage and decompose vacuum seal 60. The use of such an insulation plate has, in actual use, made it possible to maintain the vacuum seal temperature at about 200°F. when the mold temperature has risen to about 300°F.

As is shown in FIG. 1, the molding press 10 is of the type having the ram on top forcing the mold upper half 30 downward. As can be readily appreciated, however, the present invention is of equal utility when the press has a ram forcing the mold lower half 32 upward.

Figure 6:
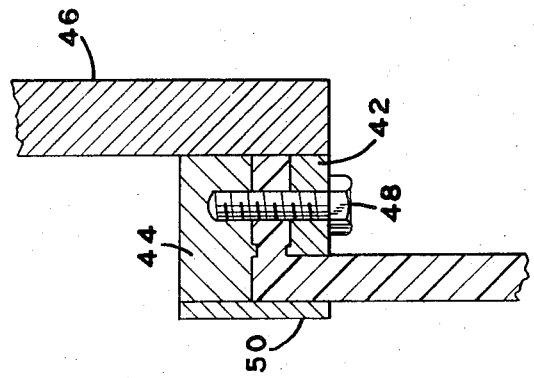
FIG. 6 is a cross section, on the same scale as FIGS. 3–5, showing the method of attachment of the vacuum seal.

The vacuum seal 60, as is best shown in FIGS. 1 and 6, is utilized as press equipment, indirectly suspended from the upper bolster plate 12 by means of a support skirt 46. A top compression ring 44 is welded to the support skirt 46 and the upper flange 68 of the vacuum seal 60 is held firmly in place between the compression ring 44 and the clamp plate 42 by a series of bolts 48, passing through holes 70 in the flange 68. Additional support is provided by retaining ring 50, which insures that none of the flexing of the seal 60 will occur at the right-angled corner.

THE VACUUM SEAL

In FIGS. 2–5 are illustrated the details of the vacuum seal 60. It comprises a generally vertical beltlike elastomeric wall member 62 with which upper flange 68 is formed integrally. By "elastomeric" is meant any material such as natural rubber (cured or uncured, vulcanized or unvulcanized), and synthetic organic materials such as styrenes, nitriles, acrylics and esters and terpolymers thereof, with styrene and acrylonitriles; styrene and vinyl pyridine; and EPDM rubbers as represented by butadiene polymers and copolymers with monoolefins such as butadiene-styrene copolymer, butadiene-acrylonitrile copolymer, butadiene-styrene-vinyl pyridine terpolymer, chloroprene, isoprene, neoprene, isobutyl rubber and others.

Embedded within wall member 62 is a plurality of reinforcing members 64 oriented vertically to provide sufficient rigidity so that when a vacuum is applied to the mold chamber, the seal wall 62 will not be sucked inwardly enough to break the seal between the inward, continuous protrusion 66 at the bottom of the seal and the outer surface 28 of the seal base 20. While the reinforcing members 64 are illustrated, in the preferred embodiment, as embedded in the seal, it should be noted that they could be employed, just as advantageously, fixed to the outside surface of wall member 62, or in any other configuration which serves the purpose of providing some vertical rigidity to the wall member 62. The reinforcing members 64 can be of any material which provides sufficient rigidity as previously discussed. Among the preferred materials would be metal rods such as brass or any other metal soft enough to eliminate any chance of the rod scratching the outer surface 28 and thereby causing an air leak. It is most desirable that the reinforcing rods 64 not be bonded to the rubber of the seal. If the seal is molded as a flat piece and the rods are bonded to the rubber, when the seal is bent to conform to the rounded corners of the base portion, the result may be a series of flats, an imperfect seal and a vacuum leak. The seal can be made by any of the commonly used methods of fabricating parts of such a strip or belt, configuration, but it preferably is made by compression molding a pair of layers of charge material with the reinforcing rods positioned therebetween. The belt-like molded strip can then be spliced, preferably with at least a portion of the curing in the area of the splice occurring after the splice is made to insure the strongest possible joint.

The wall member 62 of the vacuum seal preferably has a protrusion 66 defining a leading edge extending inwardly adjacent the bottom of the seal and extending around the entire periphery of the seal. The protrusion provides additional elastomeric material so that the seal will not weaken and stretch-out as quickly due to abrasion between outer surface 28 and wall member 62, as the seal is forced down over the tapered seal base 20. The protrusion 66 can best serve its function if it is made from an abrasion-resistant material such as the rubber compounds used for tire treads. To help the seal contract to its original shape as it is withdrawn from the seal base 20, a second protrusion 72 can be provided on the outside of the wall member 62, extending around the periphery of the seal, acting similar to a rubber band.

Figure 5:
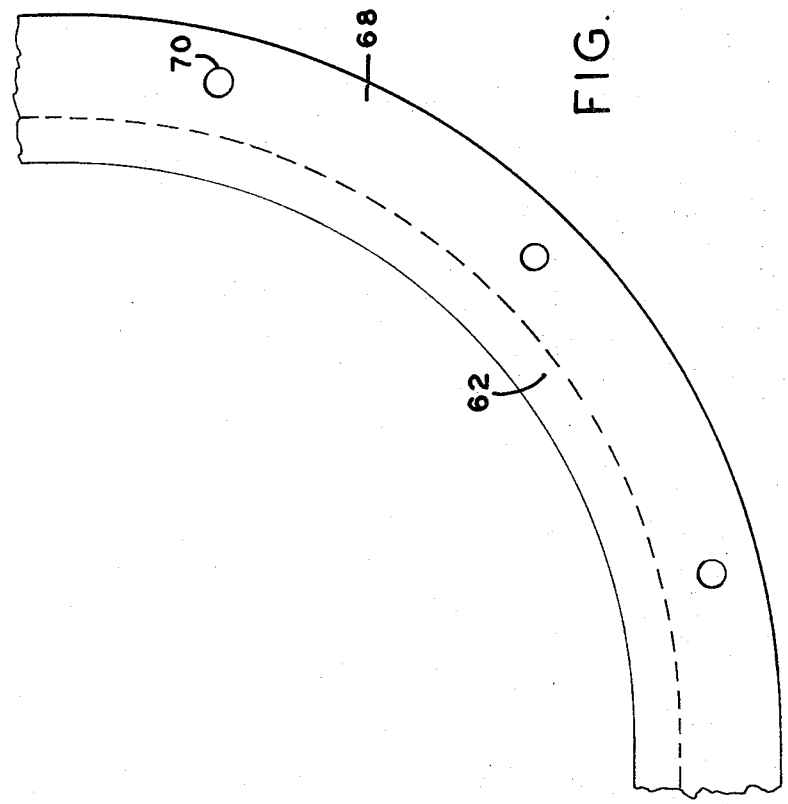
FIG. 5 is a fragmentary plan view of the vacuum seal of the same scale as FIGS. 3 and 4.

The vacuum seal 60 has the same peripheral shape as the seal base 20 which, in the subject embodiment, is a rectangle with rounded corners (see FIG. 5). Although it would be possible to establish a vacuum in the mold chamber using some modified form of an O-ring, such an arrangement would be feasible only for a circular or oval mold, since an O-ring molded into a shape other than circular could not as easily roll over within its seat during operation. Even if an O-ring were feasible it would require a pair of closely spaced apart, concentric skirts or surfaces, one of which would include a seat for the O-ring. Since the relative movement between the mold halves is from about three inches to six inches or more, the concentric skirts would have to be very accurately spaced and mounted, and the least bit of damage to or deformation of the O-ring would cause a loss of the vacuum. As a result of the vacuum seal of the present invention, it is now possible to practice the novel compression molding process described hereinafter or any conventional molding press simply by the addition of the vacuum seal 60, attachment means 40, and apparatus for pulling a vacuum, including a limit switch or other actuating means.

Figure 3:
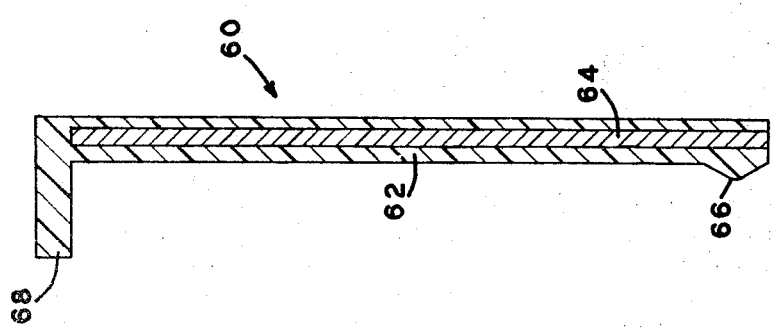
FIG. 3 is a cross section taken on line 3—3 of FIG. 2 but on a smaller scale.
Figure 2:
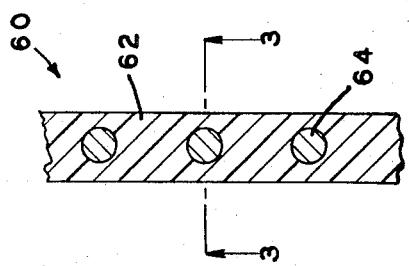
FIG. 2 is a cross section taken on line 2—2 of FIG. 1, and on a larger scale.

In the subject embodiment of the seal, illustrated approximately to scale in FIGS. 3, 4 and 5, the wall member has a thickness of about five-sixteenths of an inch and a vertical height of about 5 inches, although the height could be as little as 3 inches, the reinforcing members 64 are shown as ⅛ inch diameter rods, spaced apart on three-eight inch center-to-center distances. The diameter and spacing of the reinforcing rods could vary substantially within the scope of the present invention as long as they provide sufficient rigidity to the seal, as discussed previously. The flange 68 is shown about one inch wide and as illustrated in FIG. 5, the rounded corners of the seal should preferably have radii of about 4 inches, or not less than about 2 inches.

It should be clearly understood that within the scope of the present invention, the dimensions and general configuration could differ from those discussed.

THE MOLDING PROCESS

In operation, referring again to FIG. 1, the left side of the drawing illustrates the situation when the ram has reached about the mid-way point of its stroke, and the protrusion 66 of the seal has just come into contact with the outer surface 28. At this point, the mold chamber is sealed from the surrounding atmosphere, and evacuation begins. Vacuum line 52 permits the passage of air into the accumulator tank (not shown), which is opened by the tripping of a limit switch, and which, within the scope of the present invention, can be of any of the well-known types and arrangements. It is extremely important that the desired vacuum level be achieved before pressure is applied to the molding charge(s) and the material begins to flow, so that practically no air is trapped within the mold cavity as it closes. As one aspect of the present invention, it has been discovered that surface defects such as "pinhole" defects or porosity are caused in one of two ways. The first cause is air in the material charge itself, which is more likely to come to the surface and escape in a vacuum, especially as the charges become smaller and more numerous. The second cause is air trapped outside of the material charge, either between the charge and the mold cavity surface, or by converging flow fronts when multiple charges are used. Where flow fronts meet is referred to as a knit line, and much of the air trapped along a knit line results, not in a surface defect, but in a void within the part, thereby causing a weakened area within the part. The compression molding method of the present invention almost totally eliminates the occurence of such weakness-producing voids. The use of a vacuum in compression molding also eliminates the need for time-consuming and costly experimentation with different ranges of plasticity as well as with different charge weights and arrangements. Nor will it be necessary any longer to experiment with any of the other unsuccessful methods, and combinations thereof, which have been tried by the prior art, as discussed previously.

It has been found that as the level of vacuum is increased the number of defects decreases until the vacuum is about 22 inches Hg (see examples) beyond which an increase in the vacuum seems to be of little benefit. By 22 inches Hg is meant a difference of 22 inches in the mercury level between the atmosphere (about 30 inches Hg) and the vacuum being measured. Thus, there is less air left in the mold cavity at 22 inches Hg than at 15 inches Hg, which would be about half of the normal atmospheric pressure.

While the method and seal of the present invention have been discussed in terms of saving development and manufacturing time and cost, the primary objective is still the reduction of surface defects resulting from the entrapment of air. As can be seen from the following experimental results, this objective has been fully achieved.

EXAMPLE

In the following experiment a series of flat, sheet-like parts were molded, each from a four piece charge of BMC (bulk molding compound), i.e., four balls of a molding compound which for this test was a fiberglass reinforced polyester resin. The molding conditions were as follows:

| Molding pressure | 2000 psi. |
|---|---|
| Mold temperature | 285°F. |
| Cure time | 3 minutes |

For the sample data presented below, the lefthand column is the level of vacuum, in inches of mercury, existing in the mold chamber during the entire time that the molding compound is flowing. At each of the 10 vacuum levels, five different parts were molded and inspected. The right hand column is the average number of defects per part for the five parts. A vacuum of 0 inches Hg is merely atmospheric pressure, while 26 inches Hg is approaching a perfect vacuum.

| Vacuum | Defects |
|---|---|
| 0 | 67 |
| 18 | 30 |
| 19 | 21 |
| 20 | 16 |
| 21 | 13 |
| 22 | 5 |
| 23 | 6 |
| 24 | 7 |
| 25 | 7 |
| 26 | 6 |

It is apparent from this data that an optimum vacuum level is about 22 inches Hg beyond which the additional evacuation does not result in further reduction in the number of surface defects, although the number of internal voids probably continues to decrease. While the present invention has been tested in connection with the molding of a fiberglass reinforced polyester resin, it should be clearly understood to be equally appropriate for use in compression molding of any polymeric material which can now be compression molded.

The invention has been described in great detail sufficient to enable one of ordinary skill in the art to make and use the same. Obviously, modifications and alterations of the preferred embodiments will occur to others upon a reading and understanding of the specification and it is my intention to include all such modifications and alterations as part of my invention insofar as they come within the scope of the appended claims.

What is claimed is:

1. Apparatus comprising:
  a. a first member;
  b. a second member terminating in a portion tapering toward said first member; and
  c. a seal adapted to define, with said first and second members, a chamber, said seal comprising:
    i. a belt-like elastomeric wall member oriented generally parallel to the axis of taper of said second member;
    ii. attaching means mounted adjacent the top of said wall member for sealingly attaching said seal to said first member;
    iii. a plurality of elongated reinforcing members fixedly mounted in contaact with said wall member, said reinforcing members oriented generally parallel to the axis of taper of said second member and having sufficient rigidity to be only slightly deformed inwardly when the chamber is subjected to a vacuum; and
    iv. said wall member defining a leading edge oppositely disposed from the top of said wall member to slidingly and sealingly engage said tapered portion of said second member while said first and second members are moving from their maximum separation to their minimum separation.

2. The apparatus of claim 1 wherein said wall member comprises an elastomeric rubber material.

3. The apparatus of claim 1 wherein said wall member has a height, parallel to the axis of taper of said second member, of at least about 3 inches and a substantially uniform thickness of between about one-quarter of an inch and about 1 inch.

4. The apparatus of claim 1 wherein said elongated reinforcing members are metal rods extending substantially the entire height of said wall member.

5. The apparatus of claim 5 wherein said metal rods are embedded within said wall member and are located on generally uniform center-to-center distances of from about one-half inch to about one inch.

6. The apparatus of claim 1 wherein said first member is attached to the press portion of a compression molding press.

7. The apparatus of claim 1 wherein said attaching means comprises an inturned flange formed integrally with said wall member, said flange maintaining said wall member in a configuration which is generally a rectangle with rounded corners.

8. The apparatus of claim 1 including means operative to begin evacuating the chamber when said leading edge of said seal engages said tapered portion, said evacuation continuing during substantially the entire time said first and second members are moving toward their minimum separation.

* * * * *

PO-1050
(5/69)

UNITED STATES PATENT OFFICE
CERTIFICATE OF CORRECTION

Patent No. 3,840,239               Dated October 8, 1974

Inventor(s) Thomas W. Fazekas et al

It is certified that error appears in the above-identified patent and that said Letters Patent are hereby corrected as shown below:

Column 1, line 53, delete "sucess" and insert ---success---; and line 54, after "become" insert ---a common---.

Column 2, line 33, delete "facillitate" and insert ---facilitate---.

Column 5, lines 37, 39 and 42, delete "Q-ring" and insert ---O-ring---.

Column 8, line 9, delete "contaact" and insert ---contact---; and Claim 5, line 1, delete "5" and insert ---4---.

Signed and sealed this 3rd day of December 1974.

(SEAL)
Attest:

McCOY M. GIBSON JR.
Attesting Officer

C. MARSHALL DANN
Commissioner of Patents